United States Patent [19]

Corwin

[11] Patent Number: 4,580,910
[45] Date of Patent: Apr. 8, 1986

[54] ENGINE EXHAUST GAS TEST HARNESS
[75] Inventor: David R. Corwin, Toledo, Ohio
[73] Assignee: National Flight Services, Inc., Swanton, Ohio
[21] Appl. No.: 694,233
[22] Filed: Jan. 24, 1985
[51] Int. Cl.$^4$ .................. F02B 77/00; G01K 13/00
[52] U.S. Cl. .................. 374/144; 73/116; 374/115; 374/143
[58] Field of Search .................. 374/144, 115, 110; 174/11 R; 346/33 TP; 73/117.2

[56]     References Cited
U.S. PATENT DOCUMENTS

| | | | |
|---|---|---|---|
| 3,022,668 | 2/1962 | Lawson et al. | 374/115 |
| 3,318,151 | 5/1967 | Behrendt et al. | 346/33 TP X |
| 3,618,386 | 11/1971 | Black | 374/115 |
| 3,789,665 | 2/1974 | Hohenberg | 374/143 X |
| 4,115,998 | 9/1978 | Gilbert et al. | 374/143 X |
| 4,122,720 | 10/1978 | Podl | 374/144 X |
| 4,186,605 | 2/1980 | Bourigault | 374/115 |

Primary Examiner—Daniel M. Yasich
Attorney, Agent, or Firm—J. Gibson Semmes

[57]     ABSTRACT

In the maintenance of turbine propeller aircraft and related engines, test method and apparatus to measure engine exhaust temperature and exhaust pressure, without pulling the engine. Test harness associated with instrumental Jet Calibrator is interposed between tailpipe and airframe exhaust pipe to establish the accuracy of interstage turbine temperature and exhaust gas temperature by graphic comparisons. Both engine exhaust gas temperature and exhaust pressure may also be obtained concurrently to effect "on wing" recompensation of interstage turbine temperature during test run maintenance of the engine.

3 Claims, 4 Drawing Figures

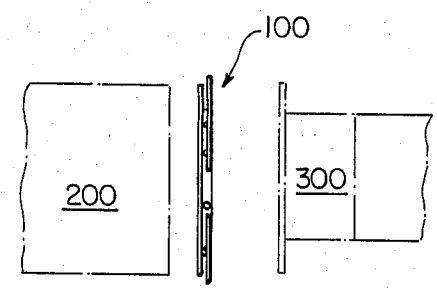
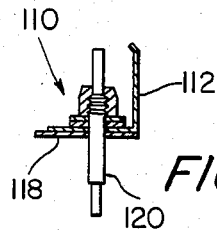
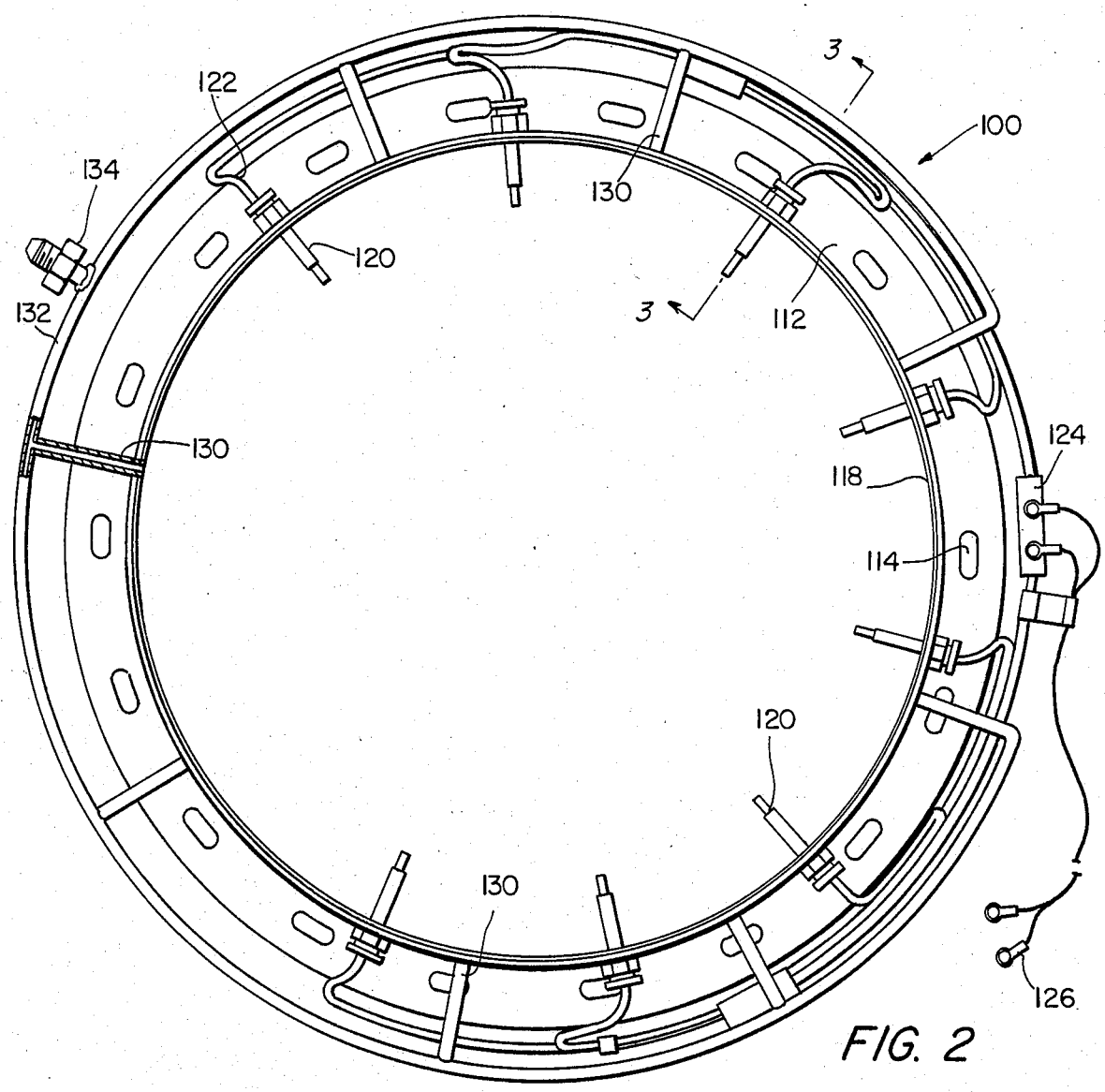

ENGINE EXHAUST GAS TEST HARNESS

BACKGROUND DESCRIPTION OF PRIOR ART

For purposes of illustration only, the invention will be described with respect its function in the maintenance of aircraft engines identified as TPE 331-5/-6. Such engines have interstage turbine temperature (ITT) sensor probes which together comprise a built-in thermocouple harness assembly, the assembly being adapted to establish readings of the raw interstage turbine temperature. In one key Maintenance Manual this installed harness assembly is identified as thermocouple assembly. The mode of utility and maintenance of currently existing interstage turbine temperature systems is set forth in Garrett: Maintenance Manual for the TPE 331-5/-6, dated Nov. 29, 1982, and such other procedures as recompensating are set forth at updated pages 588–598.10 inclusive.

In addition to the aforesaid, earlier development in this field has comprised the following U.S. Patent:

(A) F. W. WATERS et al., U.S. Pat. No. 3,348,414, dated Oct. 24, 1967;
(B) W. JURISCH et al., U.S. Pat. No. 3,368,348, dated Feb. 24, 1966;
(C) I. E. MARVIN, U.S. Pat. No. 3,377,848, dated Aug. 22, 1966;
(D) W. R. REYNOLDS et al., U.S. Pat. No. 3,509,768, dated Oct. 12, 1967;
(E) J. I. BLACK, U.S. Pat. No. 3,618,386, dated June 10, 1970; and
(F) R. BOURIGAULT, U.S. Pat. No. 4,186,605, dated Feb. 5, 1980.

Characteristic of the most advanced mode of determining interstage turbine temperature on turboprop engines is U.S. Pat. No. 4,186,605, dated Feb. 5, 1980, entitled Set of Thermocouples for Measuring the Average of Several Temperatures in a Given Space. Such devices are generally disposed adjacent turbine plenum assembly, between first and second stage rotors. The problem with associating such thermocouple probes in the vicinity defined in the engine by the three stators and associated turbines is that upon suspected operational damage to one or more sensors comprising such a probe, it is necessary to break down the entire engine for probe replacement or for examination prior thereto.

Since worn probes have a tendency during operation to short out from center wire to ground, yielding an erroneous average reading of ITT; there is no known means, at present, of determining this operational deterioration or the accuracy of interstage turbine temperature (ITT) by comparison of the raw ITT to the exhaust gas temperature (EGT). Therefore the function of this invention is to graphically establish such a verifying relationship during normal maintenance, without pulling the engine. The second useful function of the present invention, not hitherto conceived, is to enhance recompensation of interstage turbine temperature such as is established in the TPE 331 Maintenance Manual Adjustment and Text section of the aforesaid Garrett publication.

SUMMARY OF INVENTION

For use with a Howell Instruments 337E Jet Calibrator or "Jet Cal" (a diagnostic and tuning instrument for use on gas turbine engines), the invention comprises a turboprop exhaust gas temperature test harness, otherwise identified as TPE EGT Test Harness. The harness is adapted to measure exhaust gas temperature by use of bimetallic clonel and alumel thermocouple (CL. AL.) probes in parallel with a soft harness completing an 8 OHM loop. This can be accurately read with a Howell Instruments 337E Jet Calibrator. It is used for verifying accuracy of Interstage Turbine Temperature Indication by graph comparison of raw ITT to Exhaust Gas Temp as read on Howell Instruments 337E Jet Calibrator wherein EGT Test Harness is installed between TPE-331 tail pipe and airframe exhaust pipe. All readings are generally taken at 100% R.P.M. when used for comparison on a graph. The harness may also be used for exhaust gas temperature and engine exhaust pressure indications for "on wing" recompensation of interstage turbine temperature, a procedure called out in the Garrett: TPE-331 Maintenance Manual Adjustment & Test Section, dated Nov. 29, 1982.

DESCRIPTION OF THE DRAWINGS

FIG. 1 is a view in vertical elevation of the rear end of the EGT harness, unmounted.

FIG. 2 is a side view of the harness of FIG. 1; said view showing the relationship of the harness to the tailpipe and airframe exhaust pipe, the latter two elements being shown in phantom.

FIG. 3 is a vertical, sectional view of the harness of FIG. 1 taken along the lines 3—3 of FIG. 2; said view showing the relationship of the harness and thermocouple sensors.

DESCRIPTION OF THE PREFERRED EMBODIMENTS

Figure 4:
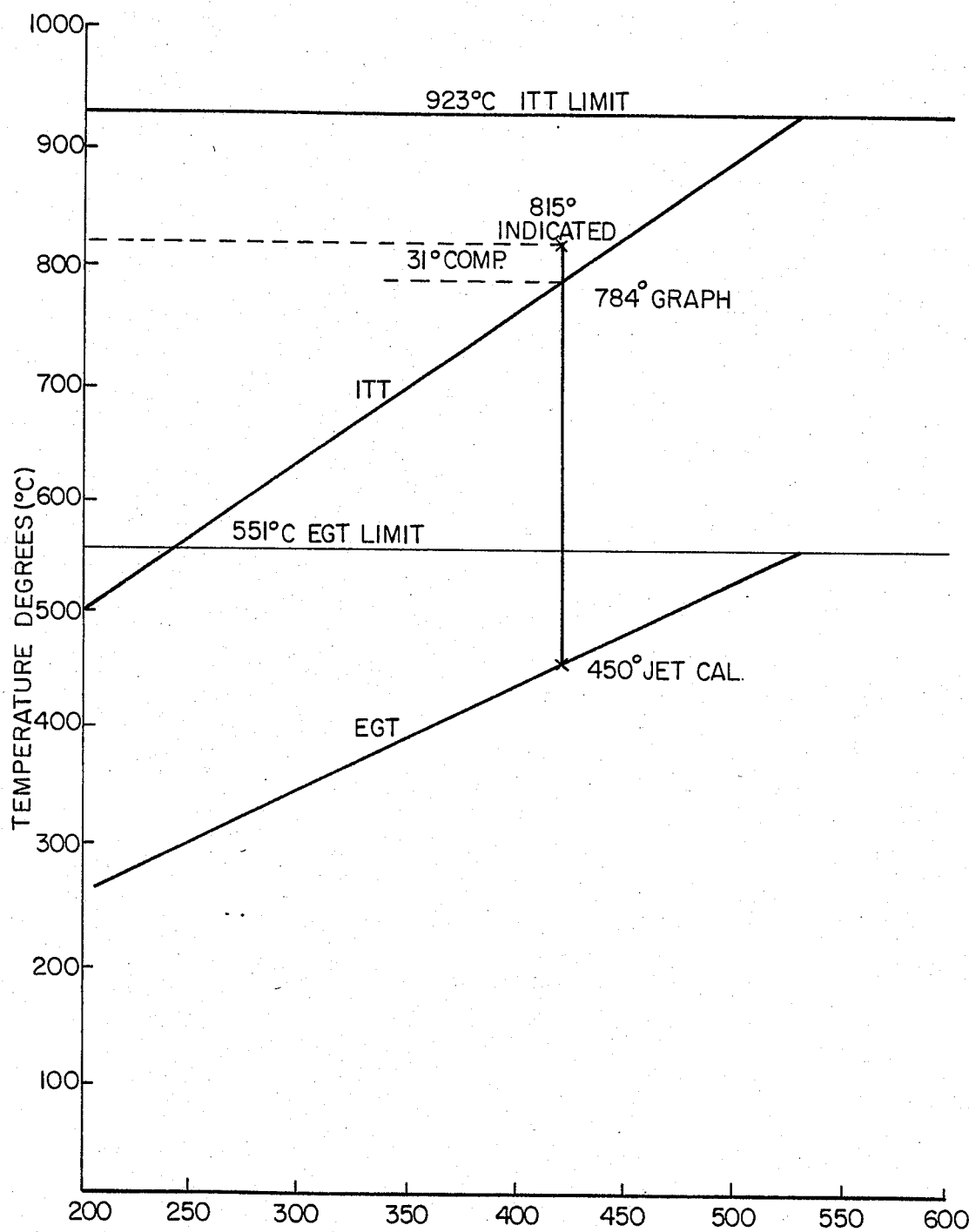
FIG. 4 is a Test Chart depicting the correlation temperature display of interstage turbine temperature (ITT) and exhaust gas temperature (EGT) temperature readings in a given test.

The test harness 100 is illustrated in FIG. 1 as adaptive to a Turboprop Engine 331, the harness being primarily designed to test the exhaust gas temperature thereof, comparative to its interstage turbine temperature. In addition, the harness is useful in engine ITT recompensation during a test run, wherein both data of exhaust temperature and exhaust pressure are required. The operative disposition of the device, relative to the engine, is illustrated in FIG. 2. Both tailpipe and exhaust pipe are shown in phantom. During engine maintenance, harness 100 is secured to the after end of the engine tailpipe 200. This attachment follows the spatial separation of the tailpipe 200 a short horizontal distance from the airframe exhaust pipe 300. Exhaust pipe 300 having been detached and separated slightly from tailpipe 200 and the harness slipped in between and secured on tailpipe 200. The exhaust pipe is then re-closed upon and re-bolted to tailpipe 200 with harness 100 secured in between in testing position. Harness 100 comprises a circular yoke 118 which is interconnected with a vertically projecting installation flange 112. Elongated mounting apertures 114 are defined in the flange; the azimuth disposition of these apertures corresponding to the tailpipe-airframe exhaust mounting apertures. Fastener nuts and bolts 116, 116' will secure the harness between the after end of the tailpipe and forward end of the airframe exhaust 200 upon final assembly. Three or more bolts will secure the yoke to the tailpipe 200 and more will be required to secure the tailpipe to the exhaust pipe 300 through the flange 112. This assembly will secure the harness so that its inner diameter will equal the inner diameter of the respective exhaust elements 200 and 300 at their normal operative junction.

The harness probes 120 are disposed inwardly from the harness 100 along radius lines passing through the axis of the harness 100, tailpipe 200 and exhaust pipe 300. The inward radial penetration from the inner wall of the tailpipe is defined as one-half the radial distance from the inner wall of the tailpipe to the base of the blades of the third stage turbine wheel (not shown).

Circular flange 112 extends outwardly of the yoke 118, the yoke defining probe mountings 120 which are directed radially inwardly, for the temperature sensors or probes 120. The sensors 120 are disposed upon the periphery of the harnness at selective, evenly spaced radials thereabout. The temperature harness includes junction 124, and connecting terminals 126; said junction comprising a point of collection for respective clonel and alumel conductors (not shown), the respective conductors having protection through the lead conudits 122, each of the lead tubes being fixedly connected to the thermocouple probes 120.

Supplemental apertures in yoke 118 accommodate and mount resealable pressure monitor connector ports 130 which are disposed in alternate positions, relative to positions of the temperature sensors. Preferably these connector ports 130 will be evenly spaced between monitoring positions of the probes and they will interconnect via common channel 132 and port 134 with a conventional water manometer as illustrated in FIG. 2.

FIG. 4 illustrates chart means for verifying accuracy of interstage turbine temperature by graph comparison of raw interstage turbine temperature (ITT) to exhaust gas temperature (EGT). This may be read on Howell Instruments 337E Jet Cal with EGT test harness installed between a TPE-331 tailpipe and airframe exhaust pipe as in FIG. 1. All readings are taken at 100% RPM when a comparison is made with this graph. In practice if there is a substantial variation in temperature comparison, the operator knows that he has an ITT problem.

In the recompensation mode, the exhaust pressure is obtained by water manometer readings which comprise an averaging of the pressures obtained from the outlets 130.

I claim:

1. In the maintenance of an operational gas turbine engine having successive turbines and a permanently installed interstage turbine temperature (ITT) harness from which average temperature readings may be electronically obtained, a method of testing the temperature parameters of the ITT harness located within the engine during the maintenance thereof without removing said ITT harness comprising:
   (A) disconnecting the exhaust pipe from the tailpipe of the engine and separating the exhaust pipe therefrom;
   (B) inserting an exhaust gas temperature (EGT) test harness between said separated exhaust pipe and tailpipe, said EGT harness having temperature sensors therein whereby average temperature readings may be electronically obtained;
   (C) reconnecting the exhaust pipe to the tailpipe thereby securing the test harness therebetween;
   (D) obtaining a relationship between ITT and EGT test harness temperature readings by operating a reference engine, of the same class as the operational gas turbine engine, with a known functional ITT harness and installed EGT test harness at 100 percent revolutions per minute over a certain preselected power range and graphically recording simultaneous ITT harness and EGT test harness temperature readings therefrom;
   (E) operating said operational gas turbine engine at 100 percent revolutions per minute over a power range similar to said certain preselected power range and comparing simultaneous temperature readings from the ITT harness and the EGT test harness of said operational gas turbine engine with those readings previously graphed.

2. The method as recited in claim 1 wherein the EGT test harness installed in said operational gas turbine engine also includes pressure ports whereby average temperature and pressure data from the EGT test harness as well as the graphically derived interstage turbine temperatures are used in recompensating turbine inlet temperature and in diagnosis of serious engine mulfunction as indicated by an abnormal high turbine inlet temperature.

3. In the testing of an operational gas turbine engine having successive turbines and a permanently installed interstage turbine temperature, ITT harness therein and an easily detachable exhaust gas temperature, EGT test harness apparatus for temporary installation between engine tailpipe and exhaust pipe comprising:
   (A) a circular yoke on the EGT test harness mounting spaced thermocouples and including pressure ports thereon;
   (B) an installing flange defined by the yoke; said flange forming apertures therein to enable temporary attachment of the apparatus with fasteners in series between the tailpipe and exhaust pipe;
   (C) said thermocouples being mounted upon the periphery of the yoke, the thermocouples protruding radially inward a distance of one-half the radial distance from the inner wall of the exhaust tailpipe to the base of existing blades of a third stage turbine wheel; said thermocouples being electrically interconnected whereby electronic readings of average temperature may be derived;
   (D) said pressure ports also being mounted upon the periphery of the yoke and having connection with a network of conduits interconnecting said ports whereby a reading of average pressure at all ports may be obtained by connection of a water manometer to a resealable fitting attached to a common channel within the said network of conduits.

* * * * *